Nov. 20, 1951   L. C. PETERSON ET AL   2,575,393
ELECTRON BEAM TUBE FILTER
Filed Feb. 27, 1947   3 Sheets-Sheet 1

INVENTORS: L. C. PETERSON
R. K. POTTER
BY
N. S. Ewing
ATTORNEY

Nov. 20, 1951  L. C. PETERSON ET AL  2,575,393
ELECTRON BEAM TUBE FILTER
Filed Feb. 27, 1947  3 Sheets-Sheet 2

VERTICAL SCANNING LINES
MODULATED IN INTENSITY
BY IMPRESSED WAVE

INVENTORS: L. C. PETERSON
R. K. POTTER
BY
N. S. Ewing
ATTORNEY

INVENTORS: L. C. PETERSON
R. K. POTTER
BY
N. S. Ewing
ATTORNEY

Patented Nov. 20, 1951

2,575,393

UNITED STATES PATENT OFFICE 2,575,393

ELECTRON BEAM TUBE FILTER

Liss C. Peterson, Chatham, and Ralph K. Potter, Morristown, N. J., assignors to Bell Telephone Laboratories, Incorporated, New York, N. Y., a corporation of New York Application February 27, 1947, Serial No. 731,232

17 Claims. (Cl. 178—44)

This invention relates to the modification of time-varying functions in accordance with preselected patterns; more particularly, it relates to electrical transducers of the types which are known in the art as transversal filters.

The behavior of electrical networks can be specified in two ways representing two different physical points of view. Ordinarily, one thinks first of the well-known steady-state point of view which describes the network performance in terms of the concepts of amplitude and phase response versus frequency. In addition to this more conventional viewpoint there is the time function viewpoint in which the network is described in terms of its amplitude-time response at the receiving end resulting from the application of an impulse of infinitesimal duration at the sending end. Network response may thus be considered either in terms of frequency or time functions. The bridge between these two avenues of approach is the Fourier Integral which may be thought of as a mathematical device for expressing a time function in terms of steady-state phenomena.

For the most part prior art practice has been to base the design of communication networks upon the steady-state frequency-amplitude characteristics and an elaborate theory has been worked out for such design procedures. The networks thus obtained contain as elements resistances, inductances and capacitances, the frequency and/or phase selective effects of which are used in various combinations to secure desired response characteristics.

On the other hand, when network design is considered from the time function point of view, that is when time rather than frequency is taken as the independent variable, one is led to a broad group of selective circuits whose principle of operation does not depend upon resonant combinations of network elements.

Selective circuits embodying the time-function concept have been disclosed in Patents 2,024,900, December 17, 1935, 2,124,599, July 26, 1938, and 2,128,257 August 30, 1938, to N. Wiener and Y. Lee, and elsewhere in the art.

It is the principal object of this invention to provide certain improvements in the art of modifying given functions of time in accordance with desired patterns of amplitude, frequency, and phase variation.

A more specific object of this invention is to provide novel techniques and apparatus for the modification of applied electrical signals in accordance with preselected admittance functions.

The system of the present invention, which may include one or more cathode ray tubes and auxiliary circuits, is designed to simulate a given network response in accordance with a time-function concept. A device of this type is known in the art as a "transversal filter," and is adapted to produce a modified output signal by a series of operations which include the following:

(1) Recording or storing the input signal;
(2) Multiplying the stored record by a predetermined weighting function; and
(3) Integrating the weighted record over discrete periods.

In accordance with one embodiment of the present invention, an electron beam which is intensity varied by means of the impressed signal, repeatedly progresses from left to right depositing electric charge in a series of parallel vertical traces on a target comprising a plurality of identical transversely disposed storage elements. The beam may either take the form of a ribbon beam coextensive with the target in a vertical direction and moving horizontally, or alternatively, a spot beam having a rapid vertical sweep and a comparatively slower horizontal motion. Interposed in the path of the beam between the electron gun and the target is a grid, comprising elements which are obliquely disposed in a plane parallel to the plane of the target and space varied in accordance with a predetermined weighting function. Successive target elements are adapted to be discharged at regular intervals and the charge collected by means of a commutative brush.

A second embodiment disclosed includes a cathode ray tube having a recording beam and a collecting beam which move in synchronism. The recording beam, which is intensity varied by the impressed function, covers the target with a series of parallel vertical traces from left to right, depositing charge on a multi-element primary target comprising a plurality of shielded plates and connected resistances having values which are arranged in space configuration in accordance with a predetermined weighting function. As in the first embodiment, the recording beam may alternatively take the form of a vertical ribbon beam coextensive with the vertical dimension of the target or a spot beam with a rapid vertical sweep. The increments of charge stored on the primary target elements are discharged in prearranged series and integrated in the output as the collecting beam progresses across a set of auxiliary target elements in synchronism with the horizontal motion of the recording beam across the primary target elements. In accordance with one modification of this embodiment, the plate-resistance target array is replaced by an array of storage elements having vertical cross-sectional dimensions which vary in accordance with the weighting function. In another modification, the target comprises condenser elements having dielectrics which vary in accordance with the weighting function.

Additional objects and features of the invention will be apparent after a study of the detailed description which follows hereinafter, and the attached drawings, of which:

Figure 3A:
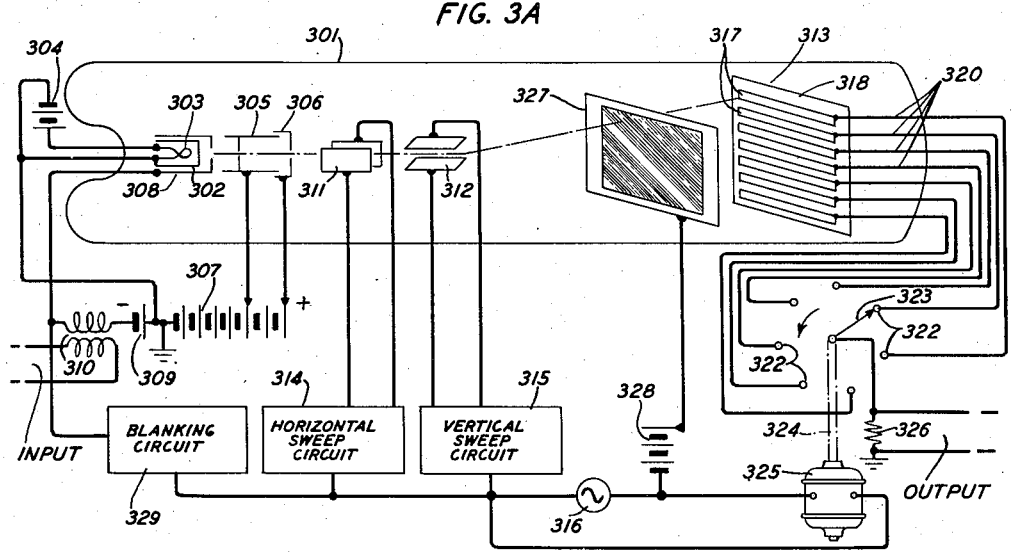
Fig. 3a shows an embodiment of the electron beam tube filter in which the charge deposited on the target is weighted by means of an interposed grid having variably spaced elements.
Figure 3B:
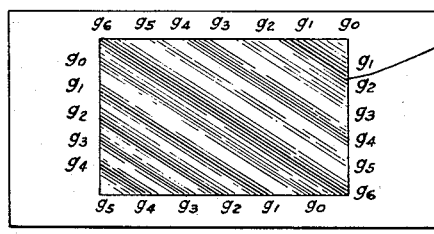
Figure 3D:
Figure 3C:
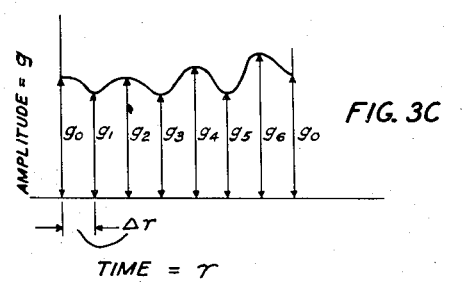
Figure 4A:
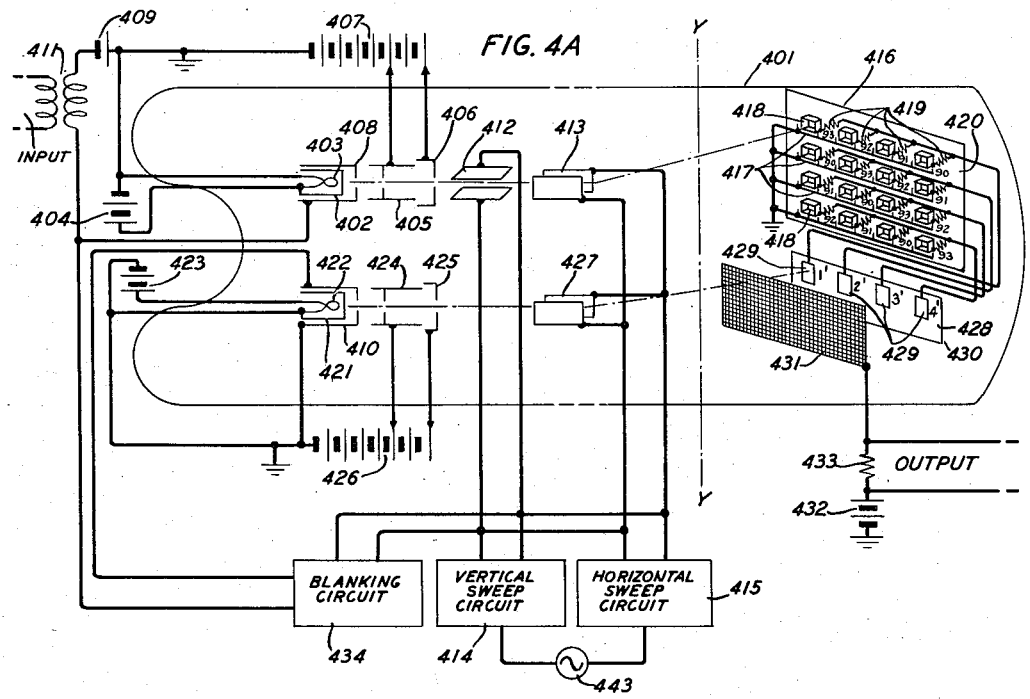

Fig. 3b shows an enlarged view of the grid 327 of Fig. 3a; Fig. 3c shows an impulse-response curve in accordance with which the grid 327 is fashioned; and Fig. 3d illustrates the intensity variations in a beam passing over the grid 327 of Fig. 3a; and Fig. 4a shows an electron beam tube filter utilizing a recording beam which scans a primary target array moving in synchronism with a collecting beam which scans a secondary target array. In Fig. 4a, the primary target comprises an array of shielded plates and connected resistances, arranged according to value in predetermined space configuration. In a modification of Fig. 4a shown in Fig. 4b, the primary target comprises an array of storage elements having a shaped vertical cross-sectional dimension and arranged in predetermined configuration.

A concept which may be helpful in interpreting the specification and claims hereinafter is that of the transfer indicial admittance of a system. This quantity is defined by J. R. Carson in Electric Circuit Theory and the Operational Calculus, McGraw-Hill, 1926, page 14, as the ratio of the output current of the system, expressed as a time function, to the magnitude of the steady electromotive force suddenly inserted at the input of the system at time $t=0$.

The time-rate-of-change of the transfer indicial admittance defined above is a function of time designated $g(t)$. The function $g(t)$ is variously referred to in the specification and claims hereinafter as the "impulse response" or merely the "g-function" of a system.

Further discussion and definition of certain mathematical concepts, such as that of the "unit impulse," which will be relied on in the detailed description hereinafter will be found in volume I of Transients in Linear Systems by Gardner and Barnes, John Wiley and Sons, 1942, pages 255–263.

Figure 1A:
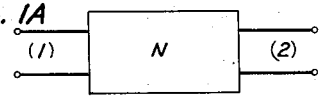
Figs. 1a to 1e are a series of diagrams illustrating the theory of operation of transversal filters.
Figure 1B:
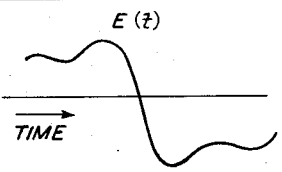
Figure 1B:
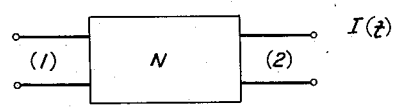
Figure 1C:
Figure 1C:
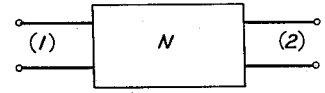

The broad principles upon which the time-function point of view is based are illustrated in Figs. 1a to 1e, to which reference is now made. Consider a frequency selective network such as is illustrated schematically by N in Fig. 1a. Let us assume that the complex voltage wave $E(t)$ shown in Fig. 1b which is any continuous function of voltage versus time, is impressed upon the input 1 of the network. At the output 2 there will then appear a current wave which we designate as $I(t)$. Now let it be supposed that the voltage wave $E(t)$ is split up into a series of narrow pulses as shown in Fig. 1c. With this pulsed wave impressed upon the input terminals 1, one should expect to obtain at the output terminals 2 very nearly the same current wave $It$ obtained before.

Figure 1D:
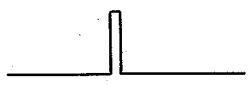
Figure 1D:
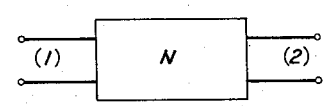
Figure 1E:
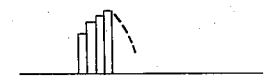
Figure 1E:
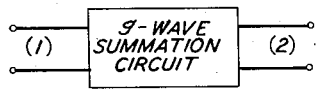
Figure 1E:

Now referring to Fig. 1d, assume that there is impressed upon the network a single pulse of the sort into which the voltage wave $E(t)$ has been subdivided. At the network output terminals 2 there now appears a function which as the pulse width approaches zero is proportional to the $g$-function of the network as defined above. It should be noted that any other pulse of different amplitude would result in the approximate $g$-function except that its amplitude would vary in proportion to the applied pulse amplitude and that moreover its time of occurrence would depend on the time of pulse application. Thus it follows as shown in Fig. 1e that in the limit the current wave $I(t)$ which appears at the output terminals 2 as a result of the application of the voltage wave $E(t)$ at the input terminals 1 is the sum of a number of overlapping $g$-functions whose relative strengths or amplitudes vary in accordance with the impressed voltage wave $E(t)$. Using somewhat more precise language one can say that if the network is subjected at the input 1 to an initial pulse at some arbitrary time, which for convenience may be called zero, and if this pulse is followed by others at specified values of time, the total response at the output terminals 2 at any later time will be the sum of the responses which have occurred up to that time.

Thus, two important principles applicable to this approach to network theory may be derived from the above. First, the network response to unit impulse of infinitesimal duration completely determines the response to any other input wave. Second, the response at any time depends upon the history of the applied input wave previous to the time in question so that the past history must be available at least over a time interval $\tau$ within which the $g$-function is of appreciable magnitude.

Therefore the network can be looked upon as a circuit for effecting the summation of a series of time displaced $g$-functions in which the individual amplitude of each of the respective $g$-functions is proportional to the corresponding time-displaced instantaneous value of the impressed voltage wave $E(t)$. This process is schematically indicated in Fig. 1e.

Adopting a slightly different point of view one can also look upon the output wave as representing at any time a weighted history or record of the input wave where the $g$-function has acted as the weighting factor.

The foregoing statements may be summarized by deriving a mathematical expression for the network response to an arbitrary driving force from the assumption that the net behavior of a linear system at any instant is a function of the linear superposition of all the responses which have occurred up to that time counting from some arbitrary starting point. Assume, for example, that a network is subjected to an initial voltage pulse $E(t)$ at the time $t=0$ and that this pulse is followed by others at specified values of time. Then the total response at any later time will be the sum of the responses which have occurred up to that time, due allowance being made for the time at which each pulse was applied.

Let the time axis then be divided into short intervals $\Delta\tau$ of equal width, the electromotive force $E(t)$ being approximated by a series of rectangular pulses applied for the duration of each time interval $\Delta\tau$. The total response at a specified time $t$ is then approximately the sum at that instant of all the elementary $\Delta\tau$ responses started previous to that instant. If the interval is very small, that is, approaches zero as a limit, the response at time $t$ to the first impulse is $\Delta\tau E(0)g(t)$, where $g(t)$ is the response to unit impulse or $g$-function as defined hereinbefore, where $E(0)$ is the amplitude of the voltage wave $E(t)$ at time $t=0$. Consider now the $(n+1)$th impulse. The response at time $t$ is $$E(n\Delta\tau)\Delta\tau g(t-n\Delta\tau)$$

In this expression it should be noted that $n\Delta\tau$ is the time of impulse application. The reason that the argument of the $g$-function in this latter expression is $t-n\Delta\tau$ and not $t$ is that this pulse does not come into existence until the time $n\Delta\tau$ and the expression is only valid for the time equal to or greater than $n\Delta\tau$. Assume an arbitrary point on the time scale to be denoted by $\tau$, thus $\tau=n\Delta\tau$. The current response $I(t)$ at the instant $t$ is the sum at time $t$ of all elementary responses that have occurred between time equal to 0 when the first impulse was started and time $t$ as the length of the time interval $\Delta\tau$ approaches zero. Hence $$I(t) = \lim_{\Delta\tau \to 0} \sum_{\tau=0}^{\tau=t} E(t)\Delta\tau g(t-\tau) \quad (1)$$

By definition of an integral this may also be written $$I(t) = \int_0^t E(\tau)g(t-\tau)d\tau \quad (2)$$

or $$I(t) = \int_0^t E(t-\tau)g(\tau)d\tau \quad (2')$$

This equation thus expresses the system response to an arbitrary driving force in terms of the response to a unit impulse, that is, an applied pulse which in the limit approaches unit area and infinitesimal duration. Thus it follows that a knowledge of the response $g(t)$ to a unit impulse is sufficient to specify completely the system performance. This implies in particular that the steady-state performance of a particular network may also be determined from a knowledge of $g(t)$ for that network. Suppose, for example, that the network is a filter passing a certain band of frequencies. This is then merely a reflection of the fact that $g(t)$ behaves in a very definite manner. To illustrate this in a general way, assume that a sinusoidal voltage $E(t)=E\sin\omega t$, where $E$ represents the steady-state amplitude and $\omega=$ the angular frequency, has been applied to the network at $t=0$; and that all transients have died out. The steady-state current can then be written as $$I(t) = E|Y_{12}(i\omega)|\sin[\omega t - \varphi(\omega)] =$$
$$Ea_{12}(\omega)\sin\omega t + Eb_{12}(\omega)\cos\omega t \quad (3)$$

where $Y_{12}(i\omega)$ is the transfer admittance between input and output terminals of the selected network and $\varphi(\omega)$ its phase angle. By writing $Y_{12}(i\omega) = a_{12}(\omega) + ib_{12}(\omega)$, in which $a_{12}$ and $b_{12}$ are constants, the second of expressions (3) is obtained. An equivalent expression may also be obtained from (2) or (2') by inserting $$E(t) = E\sin\omega t$$

and extending the range of integration to infinity (which means that transient distortion has died out) one obtains, $$I(t) =$$
$$E\sin\omega t\int_0^\infty \cos\omega\tau g(\tau)d\tau - E\cos\omega t\int_0^\infty \sin\omega\tau g(\tau)d\tau \quad (4)$$

By comparison of (3) and (4) it follows that $$\left. \begin{array}{l} a_{12}(\omega) = \displaystyle\int_0^\infty \cos\omega\tau g(\tau)d\tau \\ \\ b_{12}(\omega) = -\displaystyle\int_0^\infty \sin\omega\tau g(\tau)d\tau \end{array} \right\} \quad (5)$$

The points to be emphasized in general are, first, that the expressions (5) establish quantitative relations between the frequency selection properties of the networks and the response to unit impulse excitation; and second, that both the real and imaginary components of the transfer admittance can be calculated from a knowledge of the response to unit impulse. This relationship may also be further illustrated as follows: Multiply the second of equations (5) with $i$, the imaginary unit, and add to the first; then use Euler's formula. The result is $$Y_{12}(i\omega) = \int_0^\infty g(\tau)e^{-i\omega\tau}d\tau \quad (6)$$

from which it follows that the steady-state transfer admittance is the Fourier Transform of the unit impulse response. From a principal point of view, it is thus irrelevant whether frequency selection properties of a network are stated in terms of steady-state frequency response to sinusoidal driving forces or whether they are given as the time response to a unit impulse. The frequency response is merely the spectral analysis of the time response to a unit impulse. It also follows from (6) that $$g(t) = \frac{1}{\pi}\int_0^\infty |Y_{12}(i\omega)|\cos(\omega\tau + \theta(\omega))d\omega \quad (7)$$

where $Y_{12}(i\omega)$ denotes the amplitude and $\theta(\omega)$ the phase of the steady-state transfer admittance. Equation 7 in principle allows $g(t)$ to be calculated from a knowledge of the frequency spectrum of the steady-state transfer admittance, i. e., from the amplitude frequency and phase characteristics of the network. Moreover, we have from (5)

$$\left. \begin{array}{l} g(t) = \displaystyle\frac{2}{\pi}\int_0^\infty a_{12}(\omega)\cos\omega t d\omega \\ \\ g(t) = -\displaystyle\frac{2}{\pi}\int_0^\infty b_{12}(\omega)\sin\omega t d\omega \end{array} \right\} \quad (8)$$

Hence it follows that the time response $g(t)$ to unit impulse is completely determined when either the real or the imaginary component of the steady-state transfer impedance is specified over the entire frequency range.

Stressing the physical interpretation of the facts presented rather than the mathematical analysis, three steps are suggested by means of which an applied input function may be modified in accordance with certain admittance characteristics to produce a desired output response without resort to the conventional concepts of frequency selective networks. They are:

(1) Recording or storage of the input wave;
(2) Weighting of the stored record by means of selected $g$-functions; and
(3) Summation of the weighted record.

These are fundamental steps which can serve as building blocks in frequency selective devices operating on a time-function basis. It should be noted that in arriving at these steps no reference has been made to vibrating systems such as coil and condenser combinations nor has any use been made of the concepts of amplitude and phase versus frequency response. These concepts have now been replaced by the single concept of the $g$-function. In other words, the physical phenomena conventionally described by the amplitude and phase versus frequency functions are now described by the single function $g(t)$.

As concrete examples of $g$-functions, consider two cases of functions in which the positive and negative values are symmetrical with respect to a certain value of time, say $T_0$, where $T_0 > 0$. Consider first a low-pass filter having a uniform transfer impedance equal to $K$ from frequency zero to a cut-off frequency $\omega_c$. Outside this range it is assumed that no transmission occurs. As a consequence of the stipulation of even time response, the phase shift $\theta(\omega)$ is linear and is given by the following equation:

$$\theta(\omega) = -\omega T_0 + n.2\pi \qquad (9)$$

For the low-pass filter under consideration there is obtained a particular $g$-function, which will be designated $g_1(t)$, by substituting the above conditions in Equation 7 which relates to the generalized function $g(t)$, and integrating the expression over a chosen range of angular frequencies from zero to $\omega_c$.

$$g_1(t) = \frac{1}{\pi} \int_0^{\omega_c} \cos(\omega t - \omega T_0) K \, d\omega \qquad (10)$$

or $$g_1(t) = \frac{\omega_c K}{\pi} \frac{\sin[\omega_c(t-T_0)]}{\omega_c(t-T_0)}$$

Figure 2A:
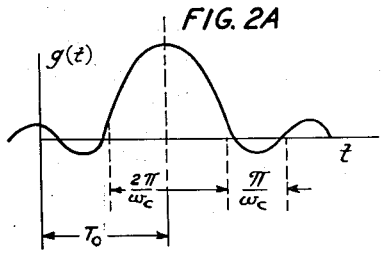
Figs. 2a and 2b show graphical interpretations of two specific filter characteristics.

This function is shown as Fig. 2a. It may be demonstrated that the width of the main oscillatory lobe is inversely proportional to the band width $f_c$. It is also seen that the received signal reaches its maximum at the time $t = T_0$ and that the maximum response is proportional to the area $\omega K$ under the amplitude characteristic.

As a second example we consider an idealized band-pass filter of even time response and with a flat amplitude characteristic between the cut-off frequencies $\omega_{c_1}$ and $\omega_{c_2}$ ($\omega_{c_2} > \omega_{c_1}$). Outside this frequency range it is assumed that no transmission can take place. From (7), substituting the conditions imposed by Equation 9, and integrating over the angular frequency range from $\omega_{c_1}$ to $\omega_{c_2}$, there is obtained a function which will be designated $g_2(t)$, which represents the particular case of the generalized $g$-function $g(t)$ as applied to an idealized band-pass filter having the above characteristics.

$$g_2(t) = \frac{K}{\pi} \int_{\omega_{c_1}}^{\omega_{c_2}} \cos(\omega t - \omega T_0) \, d\omega$$

which may be reduced to $$g_2(t) = \frac{wK}{\pi} \frac{\sin \frac{w(t-T_0)}{2}}{\frac{w(t-T_0)}{2}} \cos \omega_m(t-T_0) \qquad (11)$$

Figure 2B:
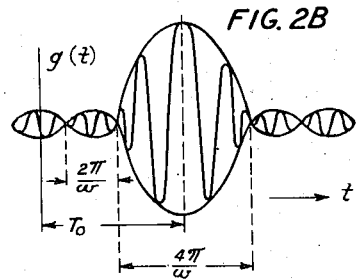

Here $w$ represents the band width $\omega_{c_2} - \omega_{c_1}$ and $\omega_m$ the arithmetic mean of the two cut-off frequencies $\omega_{c_1}$ and $\omega_{c_2}$ and may thus be considered to coincide with the mid-band frequency. Equation 11 which is roughly plotted on Fig. 2b represents an amplitude modulated carrier wave with a carrier frequency equal to that of mid-band. The maximum response occurs at $t = T_0$ and is proportional to $wK$ which is the area under the amplitude response characteristic and the length of the main oscillatory lobe is $$\frac{4\pi}{w}$$

which is inversely proportional to the band width.

Another factor which considerably influences the design of a transversal filter is the number of points at discrete intervals along a selected $g$-function curve which must be utilized in order to give a workable approximation of that function. Here one may be guided to some extent by a theorem due to L. A. MacColl, which states in effect that if the transfer admittance is large only in an interval $A$ on the angular frequency axis, then the shortest interval on the time axis which contains all the points at which the value of $g(t)$ is large, is of length $$\frac{2\pi}{A}$$

or greater. It may be noted that special cases of MacColl's theorem are found in connection with the above discussion of the idealized $g$-functions of Figs. 2a and 2b. The theorem is, however, so general that its practical use is limited.

As a concrete example consider the $g$-function $g_1(t)$ for the idealized low-pass filter of Fig. 2a and let it be assumed the three secondary lobes both to the right and left of the main lobe are taken into account. The time width of the $g$-function is then clearly $$\frac{2\pi}{\omega_c} + \frac{6\pi}{\omega_c} = 4.\frac{2\pi}{\omega_c}$$

where $\omega_c$ is the cut-off frequency. Assume further that 10 equidistant ordinates are used for the time interval $$\frac{2\pi}{\omega_c}$$

The curve representing the entire $g$-function may thus be simulated by values corresponding to 70 points selected at equally spaced intervals along the time axis.

The examples selected show that several important properties of the steady-state characteristics can be obtained directly from an inspection of the plots of the $g$-functions. It must be emphasized, however, that too much significance cannot be attached to the calculated $g$-functions since they are based upon assumptions which cannot be realized. On the other hand, the general qualitative and quantitative properties of the $g$-functions for the filters in question are believed to have been preserved, although one is not justified in attaching too much significance to any of the finer details.

The computation of the $g$-function, as discussed hereinbefore, has necessarily been in broad general terms, with several specific applications by way of illustration. From the previous discussion, the procedure will be apparent to those skilled in the art for uniquely computing $g$-functions to comply with specific sets of conditions imposed in other particular cases than those discussed.

In accordance with the present invention, a system including one or more electron beam tubes is adapted to carry out the functions outlined theoretically above. Such a system includes as basic elements (1) means for utilizing the electron beam to deposit a record of charge on a target interposed in the path of the beam; the charge varying in a horizontal direction in correlation with an impressed input function; (2) means for storing the record for a predetermined time interval; (3) means to introduce weighting in accordance with the desired $g$-function; and (4) means for collecting the weighted increments of the record over discrete periods, and integrating them in the input.

Fig. 3a of the drawings discloses an embodiment in which an electron beam is adapted to scan a target from left to right in a progression of parallel vertical lines, the deposited charge varying from line to line in accordance with variations in an impressed signal. The record of charge deposited on the configuration of transversely arranged storage elements, which comprise the target, is weighted by means of a grid interposed in the path of the beam which has its elements diagonally spaced in accordance with a chosen $g$-function. Increments of charge are collected and integrated in the output by means of a commutative brush which rotates in synchronism with the horizontal sweep of the beam, discharging the storage elements in succession.

Referring to Fig. 3a, the electron tube of the present embodiment has an enclosing glass envelope 301, and comprises a conventional electron gun which includes the following elements: a cathode 302 comprising thermoemissive material which is heated to the temperature required for electron emission by means of the filament 303 energized by the power source 304; first and second anodes 305 and 306, having small axial apertures adapted to pass electrons forming a small-dimensional spot beam, said anodes connected at respectively different positive potentials to the power source 307, whereby the electron beam is focussed and accelerated by adjustment of the potential gradient; and the control grid 308 which is connected through the secondary winding of the input transformer 310 to the negative bias battery 309, whereby the electron beam is intensity modulated in accordance with variations in the input signal.

The scanning course of the electron beam, which progresses horizontally across the target 313 by tracing a series of evenly spaced parallel vertical lines, is controlled by the vertical electrostatic deflecting plates 311, and the horizontal electrostatic deflecting plates 312, which are respectively connected to the horizontal sweep circuit 314, and the vertical sweep circuit 315, which are synchronously triggered for operation by the synchronizing oscillator 316. According to methods well known in the art, the horizontal and vertical sweep circuits 314 and 315 are so designed that during each horizontal scanning period the vertical sweep voltage is amplitude varied in a series of $n$ uniform sawteeth, corresponding to $n$ vertical scanning lines, while the horizontal sweep voltage rises linearly from a minimum to a maximum voltage. The horizontal sweep voltage returns rapidly to zero, and the cycle is repeated. In order that the difference in the recorded signal shall be negligible between the upper and lower portions of each particular vertical scanning line, the rate of the downward vertical scanning motion is rapid compared to the rate with which the beam moves across the target in a horizontal direction. The target 313 is repeatedly scanned from left to right horizontally, with a rapid periodic return to the left-hand edge of the target. The blanking circuit 329, which is connected to the horizontal and vertical sweep circuits 314 and 315, and to the grid 308 adjacent the cathode 302, serves to blank the signal during each upward vertical stroke of the beam and during the rapid horizontal return from the right-hand edge of the target 313 to the left-hand edge for a repetition of the scanning cycle.

The target 313 comprises a large number of substantially identical elongated rectangular metal strips which are mounted transversely on the inside face of the rectangular insulating backing element 318, positioned in the end of the tube 301 remote from the electron gun, and substantially perpendicular to the beam in central scanning position. The metal strips 317 which function as condensers by virtue of their capacitance to ground, are arranged in rectangular configuration so that their respective horizontal length dimensions are parallel and coextensive, and so that the vertical spacing between respective elements is substantially uniform.

Attached to each of the metal strips 317, are the lead wires 320, whereby the strips 317 are separately connected to respective ones of the contact points 322, which are arranged to be contacted at equal intervals by the rotating brush 323, attached to the shaft 324 which is driven to rotate by the conventional motor 325. The operation of the motor 325 is synchronized with the operation of the sweep circuits 314 and 315 by connection to the synchronizing oscillator 316, whereby the brush 323 is caused to progress in a counter-clockwise direction from one of the contacts 322 to the next succeeding one as the beam progresses on the target 313 from one vertical scanning line to the next, so that the brush 323 completely traverses all of the contacts 323 in the period of one complete horizontal scanning cycle of the beam. The charge collected on the respective strips 317 is periodically conducted to the output circuit across the high resistance element 326 by the rotating brush 323.

Interposed in the path of the beam, intermediate between the electron gun and the target 313, and disposed parallel to the plane of the target 313, is the $g$-function grid 327 which is connected to the positive bias battery 328, and which performs the function of weighting in accordance with a predetermined $g$-function, the increments of charge deposited on the target 313 by the scanning beam.

The $g$-function grid 327, an enlarged view of which is shown in Fig. 3b of the drawings, is rectangular in form, dimensionally coextensive with the target 313, and comprises a series of parallel wires obliquely disposed with respect to the transverse target elements 317, the spacings between successive grid wires being varied so as to modify the flow of electrons therethrough in accordance with the desired $g$-function. The obliquity of the wires and their respective spacings are so determined that one complete cycle of the chosen $g$-function, which may be calculated as provided hereinbefore in accordance with a desired output response, is represented by the relative spacings between successive wires progressing along the grid in either a horizontal or vertical direction, the minimum permissible number of wires being determined by the number of target elements 317.

Assume that a $g$-function, such as graphically shown in the plot of Fig. 3c, is to be approximated by a series of values represented by $g_0$, $g_1$, $g_2$, $g_3$, $g_4$, $g_5$, and $g_6$, which are seen to be the ordinates of the chosen $g$-function curve selected at equal intervals $\Delta\tau$ from time $\tau=0$ to time $\tau=n\Delta\tau$, which represents substantially the complete time of duration of the $g$-function. Thus, $g_0$ may be seen to equal $g(0)$, $g_1=g(\Delta\tau)$, $g_2=g(2\Delta\tau)$, etc.

Moving from right to left along the upper horizontal edge of the grid 327 in line with the uppermost one of the target elements 317, and from top to bottom along the right-hand vertical edge of the grid, the respective spacings between the grid wires are varied so as to impress on a beam of electrons passing therethrough a pattern which varies through the above series of $g$-function values in the order given. Moreover, if a horizontal line is traced from left to right across the grid 327 in a position aligned with the second from the top of the horizontal target elements 317, the spacings of the grid wires also vary in accordance with the values of the complete $g$-function cycle, respective values in the same order but displaced in phase by an amount equal to $2\pi/n$ from the values in a horizontal line coinciding with the top element 317. Here $n$ represents the total number of horizontal target elements. It is seen that the phase-displacement of the $g$-function on the grid along a horizontal line coinciding with the position of each successive target element is proportioned to the vertical distance from the top edge.

Operation of the system of Fig. 3a is as follows. The beam, intensity varied by the impressed signal $E(t)$, as shown in Fig. 3d, scans the target 313 from left to right through the interposed grid 327, successively laying down $n$-vertical columns of charge from left to right. Synchronously, the brush 323 moves in a counter-clockwise direction, discharging the record deposited on the uppermost one of the elements 317 after the recording beam has traced the last vertical column of charge on the right-hand edge of the target 313, and is returning to position for tracing the first vertical scanning column on the left-hand edge of the target 313. The brush 325 moves in succession of each of the elements 322 as the recording beam moves from left to right across the target 313.

Assume that a collection of charge from the uppermost one of the elements 317 takes place at time $t=t_0$, and that the recording beam at that time is positioned to trace the first vertical column at the left-hand edge of the target. Let the interval between successive vertical scans and likewise, between collections from successive ones of the elements 317 be $\Delta\tau$. Then, the time required for the collecting brush to move through a complete cycle, returning to the reference contact, is $n\Delta\tau$, where $n$ is the number of target elements 317. It is therefore apparent that the uncollected record present on any horizontal target element immediately prior to collection represents a history of the recorded function going back to a time $t_0-6\Delta\tau$, inasmuch as $n$ has been arbitrarily chosen to be 7 in the case under description. Thus, neglecting consideration of the interposed grid 327, for the present, the record from left to right on each of the horizontal target elements 317 is proportional to the following values at time $t=t_0$. (The vertical scanning rows are numbered in order from left to right.)

1. $E(t_0-6\Delta\tau)\Delta\tau$
2. $E(t_0-5\Delta\tau)\Delta\tau$
3. $E(t_0-4\Delta\tau)\Delta\tau$
4. $E(t_0-3\Delta\tau)\Delta\tau$
5. $E(t_0-2\Delta\tau)\Delta\tau$
6. $E(t_0-\Delta\tau)\Delta\tau$
7. $E(t_0)\Delta\tau$ But each of the above values of charges is modified in passing through the grid 327 in accordance with the $g$-value which corresponds to its particular horizontal and vertical position in the plane of the target. Considering the uppermost horizontal target element, the $g$-function modified increments of charge from left to right at time $t=t_0$ would be proportioned to the following values, substituting the $g$-function values $g_0=g(0)$, $g_1=g(\Delta\tau)$, $g_2=g(2\Delta\tau)$, etc.

1. $E(t_0-6\Delta\tau)g_6(\Delta\tau)$
2. $E(t_0-5\Delta\tau)g_5(\Delta\tau)$
3. $E(t_0-4\Delta\tau)g_4(\Delta\tau)$
4. $E(t_0-3\Delta\tau)g_3(\Delta\tau)$
5. $E(t_0-2\Delta\tau)g_2(\Delta\tau)$
6. $E(t_0-\Delta\tau)g_1(\Delta\tau)$
7. $E(t_0)g_0(\Delta\tau)$ The increments of charge listed above, which are respectively stored on the top one of the elements 317 at time $t=t_0$, are summed in the output when the brush 323 engages the connected one of the contacts 322.

Referring to Equation 2', derived hereinbefore, it is seen that a summation of the above-listed increments of charge on all the horizontal sections 1–7 of the top target element gives an approximation of the response integral for time $t=t_0$, which takes the form $$Q(t_0) = \sum_{\tau=0}^{\tau=t_0=n\Delta\tau} E(t-\tau)g(\tau)\Delta\tau \qquad (12)$$

where $Q(t_0)$ represents the total charge collected at time $t=t_0$. In the above equation, $\tau$ varies by integral values of $n$ from 0 to $(n\Delta\tau)$ where $n\Delta\tau$ is the period required to completely represent the chosen $g$-function.

Assume now, that the beam has completed the recording of charge in the first left-hand vertical column, and that the wiping contactor has moved synchronously to discharge the second lower one of the horizontal elements 317. Let the time of occurrence of this operation be designated $$t=t_0+\Delta\tau$$

the total collection of weighted increments of charge being summed as follows:

$$Q(t_0+\Delta\tau) = E(t_0+\Delta\tau)g_0\Delta\tau + E(t_0-5\Delta\tau)g_6\Delta\tau +$$
$$E(t_0-4\Delta\tau)g_5\Delta\tau + E(t_0-3\Delta\tau)g_4\Delta\tau +$$
$$E(t_0-2\Delta\tau)g_3\Delta\tau + E(t_0-\Delta\tau)g_2\Delta\tau + E(t_0)g_1\Delta\tau \qquad (13)$$

The above sum is seen to be an approximation of the response integral for time equal to $$t=(t_0+\Delta\tau)$$

Thus, it may be shown that the output of the system of Fig. 3a progressively approximates the response integral at each of a succession of equally spaced points in time, the proximity of which depends on the physical limitations of the apparatus.

By way of modification of the system of Fig. 3a the anodes 305 and 306 can be shaped and potential varied in a manner apparent to those skilled in the art, to produce a vertical ribbon beam coextensive with the vertical dimension of the target, in place of the small-dimensional spot beam described, in which case the horizontal deflecting plates 312 and the vertical sweep circuit 315 may be disconnected, the beam being moved to scan the target 313 horizontally under control of the vertical deflecting plates 311 and connected horizontal sweep circuit 314.

Another embodiment of the present invention is disclosed in Fig. 4a of the drawings, which shows an electron beam tube filter in which two electron beams are utilized: (1) a recording beam intensity varied as the impressed signal, which repeatedly scans a primary target from left to right in a progression of parallel vertical traces; and (2) a collecting beam which scans an auxiliary target from left to right in synchronism with the horizontal motion of the recording beam. The primary target comprises an array of small rectangular shielded plates and attached resistances so arranged in value that the stored record of charge is weighted in accordance with the desired $g$-function. The primary target elements are connected in predetermined series to successive elements of the secondary target, whereby through the secondary emission path provided by the collecting beam, the weighted increments of charge stored on the primary target are collected and integrated in the output in the desired order.

Referring to Fig. 4a, the electron beam tube of the present embodiment comprises a glass envelope 401 which houses two conventional electron guns adapted to respectively produce the recording beam and the wiping beam. The recording gun comprises the cathode element 402, at ground potential, which is heated to the proper temperature for electron emission by means of the filament 403 energized by the battery 404. The electron beam produced by the cathode 402 is focussed and accelerated by means of the potential gradient introduced between the first and second anodes 405 and 406, which are conventionally shaped to produce a spot beam, and are held at high positive potentials with respect to the cathode 402 by means of their respective connections to the power source 407. The grid 408 interposed between the cathode 402 and the first anode 405 is connected through the secondary of the input transformer 411 to the negative bias battery 409, and thereby serves to intensity modulate the electron beam in accordance with the input signal which is fed into the circuit through the primary of the input transformer 411.

As in the previously described embodiment of Fig. 3a, the intensity varied recording beam is directed to scan the primary target 416 from left to right in a series of parallel vertical lines under control of respective pairs of horizontal and vertical electrostatic deflecting plates 412 and 413. The vertical sweep circuit 414, to which the horizontal plates 412 are connected, and the horizontal sweep circuit 415, to which the vertical plates 413 are connected, are synchronously operated in response to the output of the sine wave oscillator 443. As described hereinbefore with reference to Fig. 3a, the vertical sweep circuit 414 is designed to generate $n$ voltage sawteeth during one linear voltage sweep of the horizontal sweep circuit 415, assuming as before, that $n$ is the number of vertical scanning lines traced during one complete horizontal scan of the target from right to left. The blanking circuit 434, which is connected to the outputs of the vertical and horizontal sweep circuits 414 and 415, is also connected to the grid 408, and functions in well-known manner to blank the signal during the upward vertical sweep of the beam, and during the horizontal return of the beam from right to left to begin a new scanning cycle.

As in the embodiment of Fig. 3a, a ribbon beam may be substituted for the spot beam disclosed, in which case the vertical sweep circuit 414 and the horizontal plates 412 are disconnected.

The primary or recording target 416 comprises a rectangular insulating backing element 420 disposed in the end of the tube remote from the electron guns beyond the deflecting plates 412 and 413, and substantially at right angles to the recording beam in central scanning position. Mounted on the insulating backing element 420 in the direction of the beam, is a series of $n^2$ substantially identical metallic plates 418, arranged in a rectangular configuration comprising $n$ vertical rows and $n$ horizontal rows, where $n$ is the number of points utilized to approximate the desired $g$-function. Preferably, the plates 418 are provided with shielding sides in order to lessen the emission of secondary electrons, so that each assumes the form of a tiny rectangular metal box having its open side in the direction of the electron gun. Respectively interposed in front of each of the horizontal rows of shielded plates 418, are the grounded wires 417, which perform the function of providing a capacitance to ground, whereby charge may be stored on each of the plates 418.

The weighting function is introduced on the respective target elements in the form of the respective attached resistances 419, each of which is successively graded in value in accordance with the ordinates of a desired $g$-function, which may be computed as described in detail hereinbefore. The elements 419 are so arranged that in moving from right to left along the top horizontal row of shielded plates 418, or from top to bottom along the right-hand vertical row of plates, their respective attached resistances 419 vary through the complete cycle of values representing the chosen $g$-function, beginning with $g_0$, each lower horizontal row representing the complete $g$-function shifted in phase from right to left by an amount $2\pi/n$ with respect to the row above.

The recording scanning beam is adapted to repeatedly scan from left to right across the target tracing one vertical scanning line on each vertical row of shielded metallic plates 418, the vertical scanning motion being so rapid compared to the motion in a horizontal direction that for practical purposes the intensity of the recording beam may be assumed to be unchanged for all of the plates in each vertical row, but appreciably changed from one vertical row of recorded charge to the next succeeding one.

Adapted to move in horizontal synchronism with the recording beam as it scans the primary target 416, is a collecting beam which functions to scan the auxiliary target 428.

The collecting beam is produced by a conventional electron gun positioned in the same end of the glass envelope 401 as the recording-beam gun, and in such space relation thereto that the collecting beam, which may comprise a spot beam of electrons, is focussed to scan the auxiliary target 428, which is disposed beneath the primary target 416, in the same vertical plane and horizontally coextensive therewith.

The collecting-beam gun comprises a conventional cathode 421, at ground potential, which is heated to the temperature for desired electron emission by means of the filament 422 connected to the energizing source 423. The electron stream produced by the cathode 421 is accelerated and focussed, by means of the first and second anodes 424 and 425, into a spot beam of relatively small dimension which is directed to scan the auxiliary target 428 in a horizontal direction under control of the vertical electrostatic deflecting plates 427, between which it passes. The vertical plates 427 are connected to the horizontal sweep circuit 415, which also controls the horizontal motion of the recording beam. The collecting beam is adapted to be blanked during its return from the right-hand to the left-hand side of the target 428 for a repetition of the scanning cycle, by means of a connection between the blanking circuit 434 and the grid 435, adjacent the cathode 421.

In one form, the auxiliary target 428, scanned by the collecting beam, comprises an insulating backing element 430 upon which is mounted a horizontal row of $n$ metallic plates, each plate positioned in respective vertical alignment with one of the $n$ vertical rows of shielded recording plates 418 on the primary target 416, the elements 418 and 429 being so relatively positioned that as the recording beam records charge on a particular vertical row of elements 418, the collecting beam rests on the vertically aligned one of the elements 429, progressing to the next successive one of the elements 429 as the recording beam progresses to the next successive vertical row on the primary target 416. The elements 429 comprise a metal such as caesium which is adapted for high density emission of secondary electrons in response to bombardment by the collecting electron beam.

Each one of the secondary target elements 429 is connected in succession from left to right to a respective one of the $n$ horizontal rows of primary target elements, in order from top to bottom, all of the shielded metallic plates 418 and connected resistors 419 in each respective horizontal row being connected in series with the other elements in that row.

Adjacent to the face of the secondary target 428 in the direction of the collecting beam, is positioned the collecting grid 431, which is maintained at a small positive potential with respect to the target 428 by means of the bias battery 432. The collecting grid 431 is connected in series with the resistor 433, across which the output of the circuit is connected.

The operation of the system of Fig. 4a is as follows: The recording beam scans the primary target 416 tracing vertical records of charge on each of the vertical rows of shielded plates 418, which record varies in a direction from left to right as the input function. Synchronously, the collecting beam moves from left to right over the auxiliary target 428. When the collecting beam bombards in succession each one of the caesium elements 429, which are respectively connected to one of the horizontal rows of primary target elements 418, a secondary emission path is provided between the respective secondary target element 429 and the collecting grid 431. Thus, at points in time separated by equal intervals which may be designated $\Delta \tau$ as with reference to the collections in the embodiment of Fig. 3a, all of the increments of charge from a particular horizontal row of elements 418 simultaneously pass through their respective g-valued resistors thereby being respectively weighted in accordance with the desired g-function value and thence into the output through the secondary-emission path provided to the collecting grid 431, where the weighted increments are summed to approximate the response integral at a particular time $t_0$, as explained with reference to the system of Fig. 3a above.

An alternative target form, such as the target assembly 436 shown in Fig. 4b may be substituted for the target 416, the circuit connections to the left of the line Y—Y' being the same as described with reference to Fig. 4a hereinbefore.

Instead of the plate and resistance array which comprises the primary target 416, the substitute primary target 436 comprises $n$ shaped metallic plates 437 mounted on the insulating backing 429', the plates 437 being coextensive horizontally, but with vertical cross-sectional dimensions which vary from right to left as the values of a chosen g-function, one, for example, that varies linearly with time. The shape of the chosen g-function curve from left to right is indicated by the shape of the uppermost one of the elements 437, cross-sectional shapes of the lower target elements being phase-shifted by an amount $2\pi/n$ from one horizontal row to the next lower one, as described hereinbefore with reference to previous embodiments. The grounded wires 417' which are respectively interposed in front of each of the elements 437 perform the same function of providing capacitance to ground as the wires 417 in Fig. 4a. The shaped elements 437 are respectively connected in succession from top to bottom to the corresponding secondary target elements 429', from left to right. The secondary target elements 429', and other elements of the system represented by primed numerals are similar in structure and function to correspondingly designated elements in Fig. 4a.

Figure 4B:
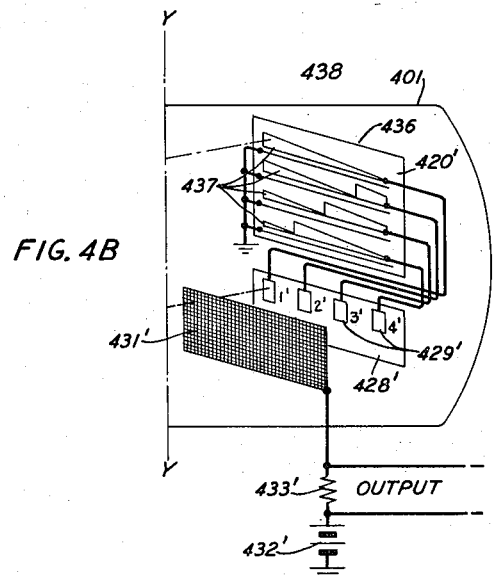

In operation, the system of Fig. 4b functions in a manner exactly similar to the system of Fig. 4a, the increments of recorded charge being weighted in accordance with the desired g-function value by the shape of the target elements, instead of by the magnitude of the attached resistors.

In another modification of the system of Fig. 4a, respective target elements may take the form of condensers having variations in the thickness or character of the dielectric material in accordance with a desired g-function.

Attention is also called to the fact that in any of the embodiments shown, the loss-frequency characteristics of the system may be altered by simply changing the scanning rates of the recording and collecting beams, thus permitting controllable cut-off frequency of low and high-pass filters, and proportional variations in the band widths and mid-band frequencies of band-pass filters.

Other means for producing modifications in accordance with a desired g-function will be apparent to those skilled in the art. Likewise, it will be apparent that within the scope of this invention, configurations of g-function values other than the rectangular form which is disclosed herein for convenience of illustration, may be utilized to approximate the response integral. The scope of this invention is not to be construed as limited to any particular element or combination of elements which comprise the illustrative embodiments disclosed herein.

What is claimed is:

1. In combination, an energy ray device comprising a ray-energized, charge-storing target, means for continually sweeping the ray across said target, means for concurrently varying the strength of said ray under the control of the varying instantaneous amplitude of an applied signal, a multiplicity of output connections for receiving electrical charges from said target, said output connections being individual to different time increments within each of a succession of time intervals of predetermined length, a common output circuit coupled to receive energy from said multiplicity of output connections in continually repeated succession, and means including a multiplicity of separate charge-storing target elements whereby the said energy received by said common output circuit from any said output connection is a multiplied function of a predetermined weighting function and the varying instantaneous amplitude of the applied signal integrated over a preceding time interval of the said predetermined length.

2. A combination in accordance with claim 1 in which said last-mentioned means includes means interposed in the path of said ray for modifying the strength of said ray in the course of its movement in conformity with said weighting function.

3. A combination in accordance with claim 1 in which said last-mentioned means includes a screen interposed in the path of said ray so shaped that a said ray progresses across one of said target elements the ray is impeded variably in conformity with said weighting function.

4. A combination in accordance with claim 1 in which each of said target elements comprises a plurality of charge-storing sub-elements and separate couplings therefrom to an individually corresponding one of said output connections, the said couplings from each of said target elements varying in energy-transmitting effectiveness from one to another in conformity with said weighting function.

5. A combination in accordance with claim 1 in which the charge-storing capacity of each of said target elements varies from one point to another thereof in conformity with said weighting function.

6. A system comprising in combination a cathode-ray tube having a source of a beam of electrons, a charge-storing target interposed in the path of the beam produced by said source, and beam-deflecting means, a sweep-circuit connected to said beam-deflecting means to control said beam to repeatedly scan said target producing a series of substantially parallel columns of charge, a signal source connected to said cathode-ray tube to control the deposition of charge by said beam on said target in accordance with the instantaneous variations of said signal, said target comprising a plurality of charge-storing elements arranged in preselected order in a direction lateral to the direction of said beam, a multiplicity of outlets individual to different sets of said charge-storing target elements in prearranged order, a common output circuit, switching means under control of said sweep circuit and operating in synchronism with the scanning motion of said beam for connecting said outlets to said output circuit in periodic succession, and means comprising said target elements for discharging elements of charge into said common output from each of said outlets which are proportional to successive values of said signal amplitude integrated over a given time interval and multiplied in order of time by selected values of a given weighting function.

7. A system in accordance with claim 6 in which said means comprising said target elements comprise variations in the plane of said target in the shape of said target elements in accordance with selected values of said weighting function.

8. A system in accordance with claim 6 in which said means comprising said target elements comprise variations in the plane of said target in the respective potentials of said target elements in accordance with selected values of said weighting function.

9. A system in accordance with claim 6 in which said means comprising said target elements includes a grid interposed between said source of said beam of electrons and said target, said grid having elements which are respectively spaced in a plane parallel to the plane of said target in accordance with selected values of said weighting function.

10. A system in accordance with claim 6 in which said means comprising said target elements includes separate resistances connected between each of the respective target elements and said output circuit, the values of the respective resistances along the plane of said target being space varied in accordance with selected values of said given weighting function.

11. A system in accordance with claim 6 in which said switching means comprises a source of a second beam of electrons and in which said outlets comprise target elements having a high coefficient of secondary emission, and a second beam-deflecting means connected to said sweep circuit to control said second beam to contact said outlets in succession, providing a secondary emission path between said outlets and said common output circuit.

12. In combination, an energy ray device comprising a ray-energized target comprising a multiplicity of charge-storing elements having a prearranged order in the plane of said target, means for continually sweeping the ray across said target, a single source of applied signal, means for concurrently varying the strength of said ray under the control of the varying instantaneous amplitude of said signal, a multiplicity of output connections individual to prearranged groups of said target elements for receiving electrical charges from the elements of said respective groups, a common output circuit coupled to receive energy from each of said output connections in rotation during a time interval of given length and in continually repeated succession through a series of said time intervals, and means including said charge-storing target elements whereby the said energy received by said common output circuit from each of said multiplicity of output connections during any said interval is a multiplied function of a predetermined weighting function and the varying instaneous amplitude of the applied signal integrated over a preceding time interval of the said given length.

13. An electrical translation device comprising in combination a cathode-ray tube, a source of a beam of electrons, a target interposed in the path of said beam, said target comprising a plurality of electrically insulated charge-storing components arranged along a series of substantially parallel lines in the plane of said target, an output circuit, commutating means for connecting each of said target components in succession to said output circuit, a signal source, a scanning mechanism for moving said beam to deposit a pattern of charge on the components of said target which varies in the direction of said lines in accordance with the signal amplitude of said signal source, and means for varying the discharge into said output circuit along the line of each of said target components in accordance with a succession of values of a weighting function, the order of said values being rotated from one of said components to the next.

14. An electrical translation device comprising in combination a cathode-ray tube, a source of a beam of electrons, a target interposed in the path of said beam, said target comprising a plurality of electrically insulated charge-storing components arranged along a first series of substantially parallel lines in the plane of said target, an output circuit, commutating means for connecting each of said target components in succession to said output circuit, a signal source connected to vary the amplitude of said beam in accordance with the signals of said signal source, a scanning mechanism for moving said beam to scan said target components in a second series of parallel lines transversely disposed with respect to the lines of said first series, and means comprising a grid having variably spaced elements interposed between said beam source and said target for varying the amount of charge released into said output circuit along the line of each of said target components in accordance with a succession of values of a weighting function, the order of said values being rotated from one component to the next.

15. An electrical translation device comprising in combination a cathode-ray tube, a source of a beam of electrons, a target interposed in the path of said beam, said target comprising a plurality of electrically insulated charge-storing components arranged along a series of substantially parallel lines in the plane of said target, commutating means for connecting each of said target components in succession to said output circuit, a signal source, a scanning mechanism for moving said beam to deposit a pattern of charge on the components of said target which varies in the direction of said lines in accordance with the signal amplitude of said signal source, and means for varying the discharge into said output circuit along the line of each of said target components comprising variations in the shape of each said component in accordance with a succession of values of a weighting function, the order of said values being rotated from one of said components to the next.

16. An electrical translation device comprising in combination a cathode-ray tube, a source of a beam of electrons, a target interposed in the path of said beam, said target comprising a plurality of electrically insulated charge-storing elements arranged in separate parallel linear series in the plane of said target, the elements of each of said series connected together to an outlet individual to that series, an output circuit, commutating means for connecting each of said outlets in succession to said output circuit, a signal source, a scanning mechanism for moving said beam to deposit a pattern of charge on the elements of said target which varies in the direction of extent of said series in accordance with the signal amplitude of said signal source, and means comprising a resistance element connected between each of said elements and its outlet for modifying the current discharged by each said element into its respective outlet, wherein the value of resistance attached to each of the target elements in a given one of said series varies in accordance with successive values of a weighting function, the order of said values being rotated from one of said series to the next.

17. An electrical translation device comprising in combination a cathode-ray tube, a source of a first beam of electrons, a target interposed in the path of said first beam, said target comprising a plurality of electrically insulated charge-storing components arranged along a series of substantially parallel lines in the plane of said target, a signal source, a scanning mechanism for moving said first beam to deposit a pattern of charge on the components of said target which varies in the direction of said lines in accordance with the signal amplitude of said signal source, an output circuit, a source of a second beam of electrons, means for moving said second electron beam in synchronism with said first electron beam to provide a discharge path between each of said target components in succession and said output circuit, and means for varying the discharge into said output circuit along the line of said target components in accordance with a succession of values of a weighting function, the order of said values being rotated from one of said components to the next.

LISS C. PETERSON.
       RALPH K. POTTER.

REFERENCES CITED

The following references are of record in the file of this patent:

UNITED STATES PATENTS

| Number | Name | Date |
|---|---|---|
| 2,219,021 | Riesz | Oct. 22, 1940 |
| 2,275,224 | Henroteau | Mar. 3, 1942 |